(12) United States Patent
Mizutani et al.

(10) Patent No.: US 7,507,279 B2
(45) Date of Patent: Mar. 24, 2009

(54) AIR CLEANER

(75) Inventors: Yoshiro Mizutani, Kariya (JP); Yasufumi Shibata, Kariya (JP)

(73) Assignee: Toyota Boshoku Kabushiki Kaisha, Aichi-Ken (JP)

( * ) Notice: Subject to any disclaimer, the term of this patent is extended or adjusted under 35 U.S.C. 154(b) by 452 days.

(21) Appl. No.: 11/492,160

(22) Filed: Jul. 24, 2006

(65) Prior Publication Data

US 2007/0022880 A1 Feb. 1, 2007

(30) Foreign Application Priority Data

Jul. 26, 2005 (JP) ............................. 2005-216348

(51) Int. Cl.
*B01D 53/02* (2006.01)
*F02M 33/02* (2006.01)

(52) U.S. Cl. .............................. 96/135; 55/499; 55/500

(58) Field of Classification Search ................... 95/146; 96/134, 135, 147, 153, 154; 55/490, 497, 55/499, 500, 511, 385.3; 123/518
See application file for complete search history.

(56) References Cited

U.S. PATENT DOCUMENTS

| | | | | |
|---|---|---|---|---|
| 3,368,326 A | * | 2/1968 | Hervert | 96/109 |
| 3,747,303 A | * | 7/1973 | Jordan | 96/135 |
| 4,279,630 A | * | 7/1981 | Nakamura et al. | 96/138 |
| 4,541,847 A | * | 9/1985 | Oie et al. | 96/58 |
| 6,592,655 B2 | | 7/2003 | Iriyama et al. | |
| 6,692,555 B2 | | 2/2004 | Oda et al. | |
| 7,344,586 B2 | * | 3/2008 | Zulauf et al. | 95/143 |
| 7,360,530 B2 | * | 4/2008 | Oda et al. | 123/518 |
| 2005/0279210 A1 | * | 12/2005 | Hirata | 96/138 |
| 2005/0284298 A1 | * | 12/2005 | Hirata | 96/134 |
| 2006/0272509 A1 | * | 12/2006 | Uemura et al. | 96/134 |
| 2006/0283326 A1 | * | 12/2006 | Oda | 96/134 |
| 2007/0113740 A1 | * | 5/2007 | Oda | 96/134 |
| 2008/0168902 A1 | * | 7/2008 | Suzuki | 96/109 |

FOREIGN PATENT DOCUMENTS

| | | |
|---|---|---|
| JP | 2001-336454 | 7/2001 |
| JP | 2001-263177 | 9/2001 |
| JP | 2003-042017 | 2/2003 |

* cited by examiner

*Primary Examiner*—Frank M Lawrence
(74) *Attorney, Agent, or Firm*—Caesar, Rivise, Bernstein, Cohen & Pokotilow, Ltd.

(57) ABSTRACT

A fuel adsorption member 16 is fixed to an inner surface of a housing 13 by fixing pins 14. A fuel vapor leaking from an intake system of an engine is adsorbed by an active carbon included in an adsorption sheet member of the fuel adsorption member 16. The fuel adsorption member 16 is arranged along an inner surface of the housing 13. Accordingly, when an engine is operated, the fuel adsorption member 16 can reduce a ventilation resistance without being adversely affecting an intake air E. Further, the fuel adsorption member 16 is fixed to an inner surface of the housing 13 in accordance with a swaging of the fixing pins 14. Therefore, it is possible to prevent a damage of the fuel adsorption member 16 caused by a vehicle vibration, a fluctuation of an intake pressure or the like, and a reduction of a fuel adsorbing function caused by a wear of the active carbon.

14 Claims, 9 Drawing Sheets

AIR CLEANER

BACKGROUND OF THE INVENTION

The present invention relates to an air cleaner provided with a fuel adsorption member for adsorbing a fuel vapor leaking from an intake system of an engine.

This kind of air cleaner is disclosed, for example, in Japanese Laid-Open Patent Publication No. 2001-263177, Japanese Laid-Open Patent Publication No. 2001-336454 and Japanese Laid-Open Patent Publication No. 2003-42017.

The air cleaner described in Japanese Laid-Open Patent Publication No. 2001-263177 is provided with sheet-like fuel adsorption members 101 including an active carbon having a fuel adsorbing function, as shown in FIGS. 13 and 14. The fuel adsorption members 101 are arranged downstream of a filter element 102, and is attached within a housing 104 in a hanged state. In this structure, at an engine stop time when an intake air E does not exist, the fuel adsorption members 101 are in a hanged state due to its own weight, as shown by solid lines in FIGS. 13 and 14. At this time, the fuel adsorption members 101 are arranged so as to face an outlet port 103 of a housing 104, and adsorb a fuel vapor leaking from the engine. Further, at an engine operating time when the intake air E exists, the fuel adsorption members 101 are deformed along a flow of the intake air E due to an application of the pressure of the intake air E, as shown by two-dot chain lines in FIGS. 13 and 14. At this time, the fuel adsorption members 101 allow an inflow of the intake air E to the outlet port 103.

In the air cleaner described in Japanese Laid-Open Patent Publication No. 2001-336454, a plurality of projections 112 are provided in an upper wall of a housing 111 while being spaced with each other, as shown in FIG. 15. A fuel adsorption member 113 is formed by applying a material to a gap between the projections 112 and an inner surface of the upper wall of the housing 111, and solidifying the applied material. The material forming the fuel adsorption member 113 is prepared by mixing a powdery active carbon to an acrylic based resin emulsion.

The air cleaner described in Japanese Laid-Open Patent Publication No. 2003-42017 is provided with a sheet-like fuel adsorption member 121, as shown in FIG. 16. The fuel adsorption member 121 is arranged downstream of a filter element 122, and is attached within a housing 123 in such a manner as to cut across a flow path of the intake air E (an air flow path).

However, in the structure shown in FIGS. 13 and 14, even if the fuel adsorption members 101 get out of the air flow path by the intake pressure, a part of the air flow path is obstructed by the fuel adsorption member 101, as shown by the two-dot chain line in the drawing. Accordingly, a ventilation resistance is increased, and there is a risk that a fuel consumption and an engine output are adversely affected. Further, the fuel adsorption members 101 repeat deformation in accordance with a fluctuation of an air flow, and the positions of the fuel adsorption members 101 are changed by little and little in accordance with a vibration of a vehicle or a fluctuation of an intake pressure. Accordingly, a fatigue is accumulated in the fuel adsorption members 101, and the fuel adsorption members 101 tend to be damaged at an early stage. Further, a wear powder of the active carbon tends to be generated by a friction between the active carbons and a friction between the active carbon and a fiber retaining the active carbon. For these reasons, not only a fuel adsorbing function of the active carbon is lowered, but also there is a risk that a fragment of the fuel adsorption members 101, the wear powder of the active carbon or the like is sucked into the engine so as to cause an engine malfunction.

Particularly, in the structure shown in FIG. 13, since the fuel adsorption member 101 is supported to the housing 104 only by an upper end thereof, the fuel adsorption member 101 tends to be damaged by an impact pressure of a backfire.

In the structure shown in FIG. 15, the fuel adsorption member 113 is formed by applying the emulsion to the upper wall of the housing 111. Accordingly, a reinforcing member for coping with the impact pressure and a heat of the backfire cannot be provided on a surface of the fuel adsorption member 113. Therefore, the surface of the fuel adsorption member 113 tends to be damaged by the impact pressure and the heat of the backfire. Further, in the fuel adsorption member 113, the active carbon having the fuel adsorbing function is buried in the resin. Accordingly, even if the resin formed of the emulsion is porous, the fuel adsorbing function of the active carbon is limited to a large degree because the surface of the active carbon is covered with the resin.

In the structure shown in FIG. 16, since the air flow path is obstructed by the fuel adsorption member 121, there is a risk that the ventilation resistance is increased, and the fuel consumption and the engine output are adversely affected. Even it the reinforcing means is provided in the fuel adsorption member 121, the fuel adsorption member 121 is directly exposed to the impact pressure of the backfire substantially on the entire surface thereof. Accordingly, the fuel adsorption member 121 tends to be damaged. In order to prevent this, the surface downstream of the fuel adsorption member 121 may be reinforced by a sheet. As a result, there is a high possibility that the ventilation resistance is further increased.

Therefore, in accordance with the conventional structures, it is impossible to sufficiently satisfy the demand for a reduction of the ventilation resistance, the fuel adsorbing function of the fuel adsorption member, and durability.

SUMMARY OF THE INVENTION

An objective of the present invention is to provide an air cleaner capable of lowering a ventilation resistance, preventing a damage of a fuel adsorption member, maintaining a fuel adsorbing function high over a long term, and preventing an engine malfunction.

To achieve the foregoing objective and in accordance with one aspect of the present invention, an air cleaner provided with a filter element within a housing is provided. The air cleaner includes a fuel adsorption member for adsorbing a fuel vapor The fuel adsorption member is arranged downstream of the filter element The fuel adsorption member is provided with a sheet member having a fuel adsorbing function, and a frame for fixing the sheet member to the housing. The frame has a rigidity. The sheet member is provided in a tensioned manner in an inner side of the frame. The fuel adsorption member is provided with a portion which is bent or curved along at least two surfaces facing an air flow path within the housing. The two surfaces are arranged adjacent to each other. The fuel adsorption member extends along the air flow path. The support member is provided in the frame for supporting the sheet member. The support member maintains the sheet member in a bent state or a curved state in the bent portion or the curved portion of the fuel adsorption member.

In accordance with another aspect of the present invention, a manufacturing method of a fuel absorption member having a fuel adsorbing function is provided. The method includes: arranging two retaining members retaining fuel adsorbent while spacing the retaining members from each other; arranging a pair of covering sheets so as to hold both retaining members in between; forming a sheet main body by welding both the covering sheets at outer edge portions thereof and an outer peripheral portion of the retaining member; arranging the sheet main body in a mold after bending the sheet main body at a predetermined position; and forming a frame retaining the sheet main body in a state of bending, by injecting a molten resin into the mold and solidifying the molten resin.

Other aspects and advantages of the invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

First Embodiment

A description will be given below of a first embodiment in accordance with the present invention with reference to FIGS. 1 to 7.

Figure 1:
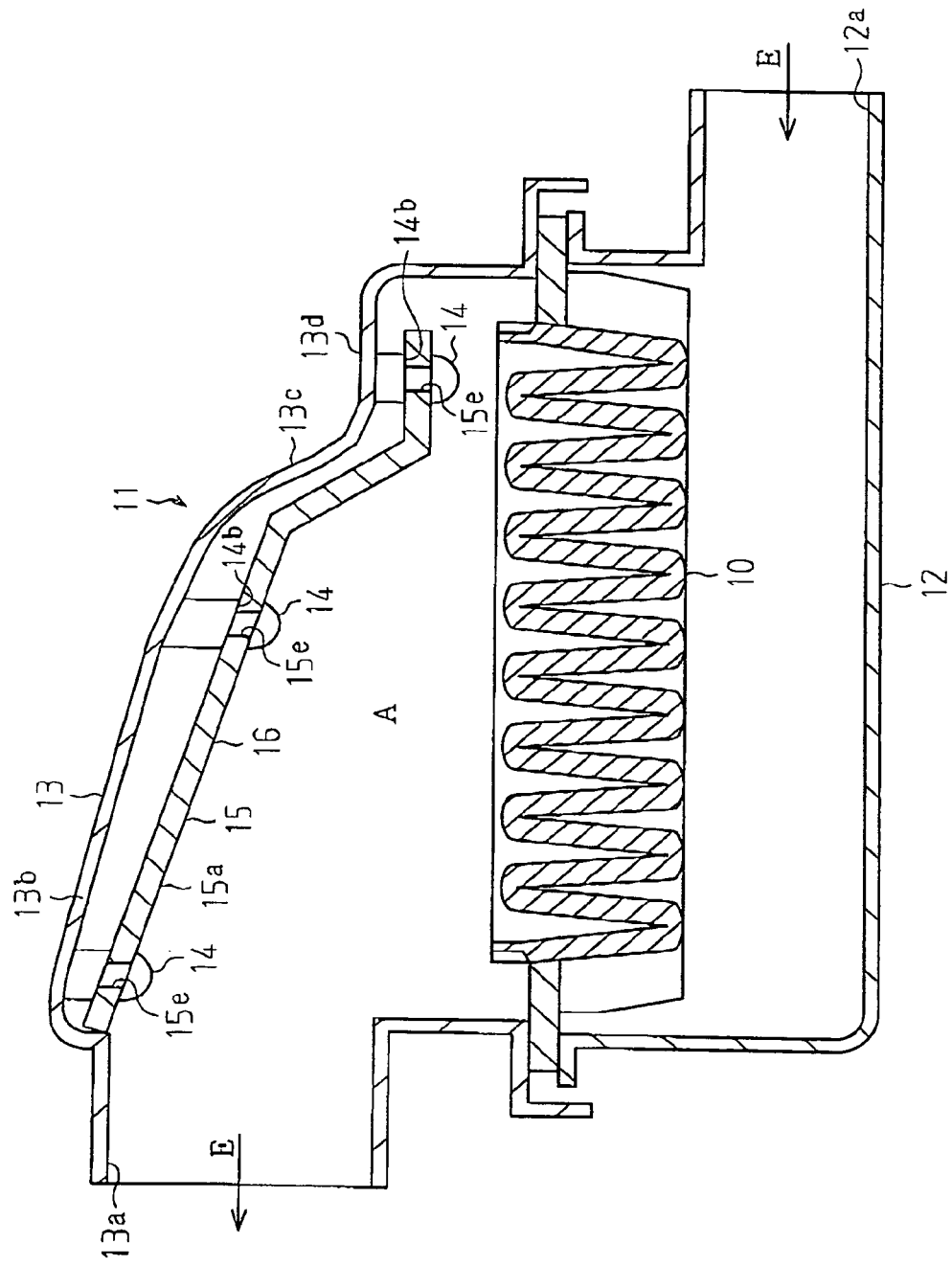
FIG. 1 is a vertical cross-sectional view showing an air cleaner in accordance with a first embodiment.

As shown in FIG. 1, a case of an air cleaner 11 is formed by a first housing 12 and a second housing 13. The first housing 12 has an inlet port 12a, and an upper face of the first housing 12 is opened. The second housing 13 has an outlet port 13a, and a lower face of the second housing 13 is opened. A filter element 10 filtrating an air sucked to an engine is arranged between the first housing 12 and the second housing 13. The filter element 10 is arranged in such a manner as to intersect a flow path A of an intake air E reaching to the outlet port 13a from the inlet port 12a.

Figure 2:
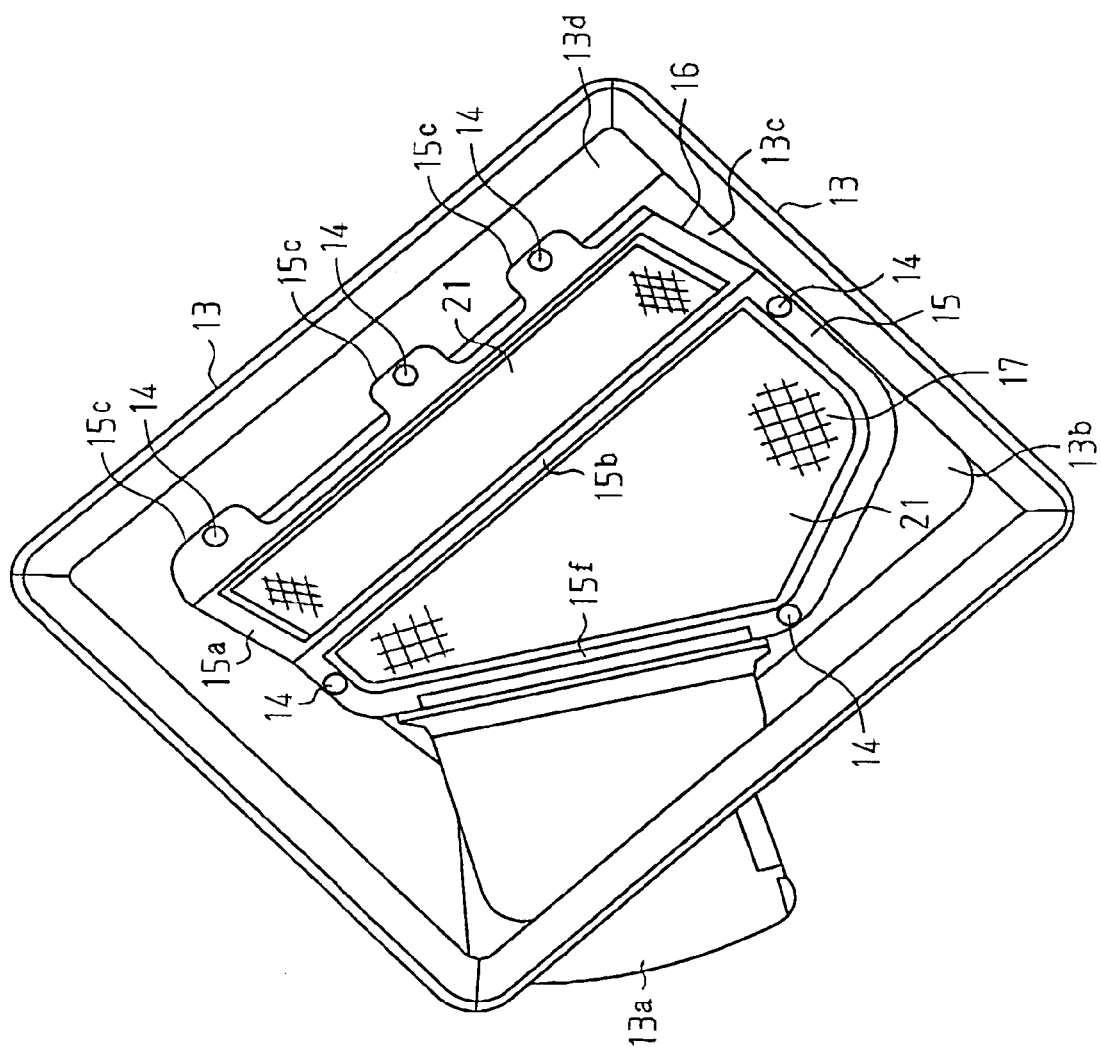
FIG. 2 is a bottom view showing the air cleaner in a state in which a first housing is detached.

An upper wall portion of the second housing 13 is provided with a first top wall portion 13b adjacent to the outlet port 13a, a slant wall portion 13c adjacent to the first top wall portion 13b, and a second top wall portion 13d adjacent to the slant wall portion 13c. As shown in FIGS. 1 and 2, a plurality of fixing pins 14 extend to a lower side from inner surfaces of the first top wall portion 13b and the second top wall portion 13d. The fixing pins 14 extend in the same direction, and are arranged in parallel to each other. A fuel adsorption member 16 extends along the first top wall portion 13b, the slant wall portion 13c and the second top wall portion 13d. In other words, the fuel adsorption member 16 extends along a flow direction of the intake air E. A gap S is provided between the fuel adsorption member 16, and the first top wall portion 13b, the slant wall portion 13c and the second top wall portion 13d. The gap S communicates with a flow path A of the intake air E flowing within the second housing 13, in an outer peripheral end of the fuel adsorption member 16.

Figure 3:
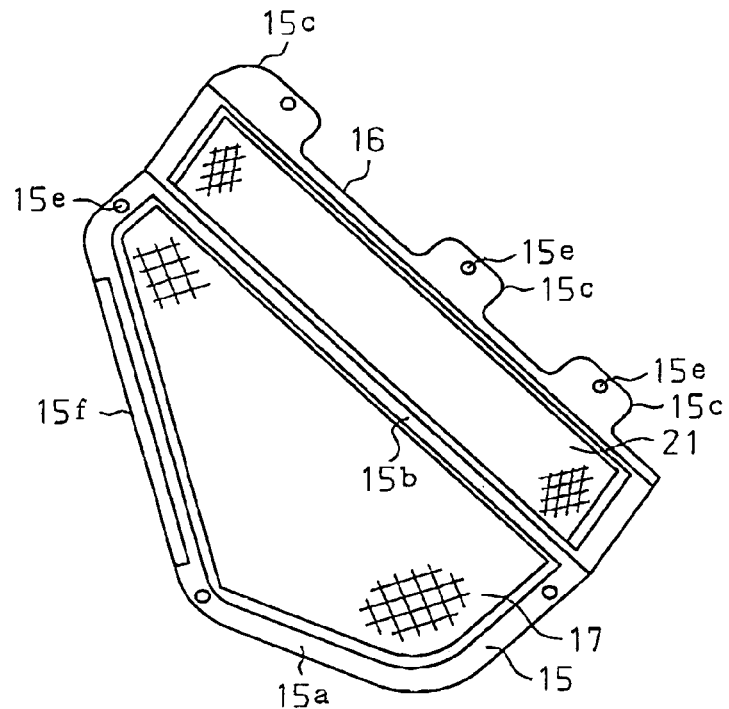
FIG. 3 is a perspective view of a fuel adsorption member.
Figure 4:
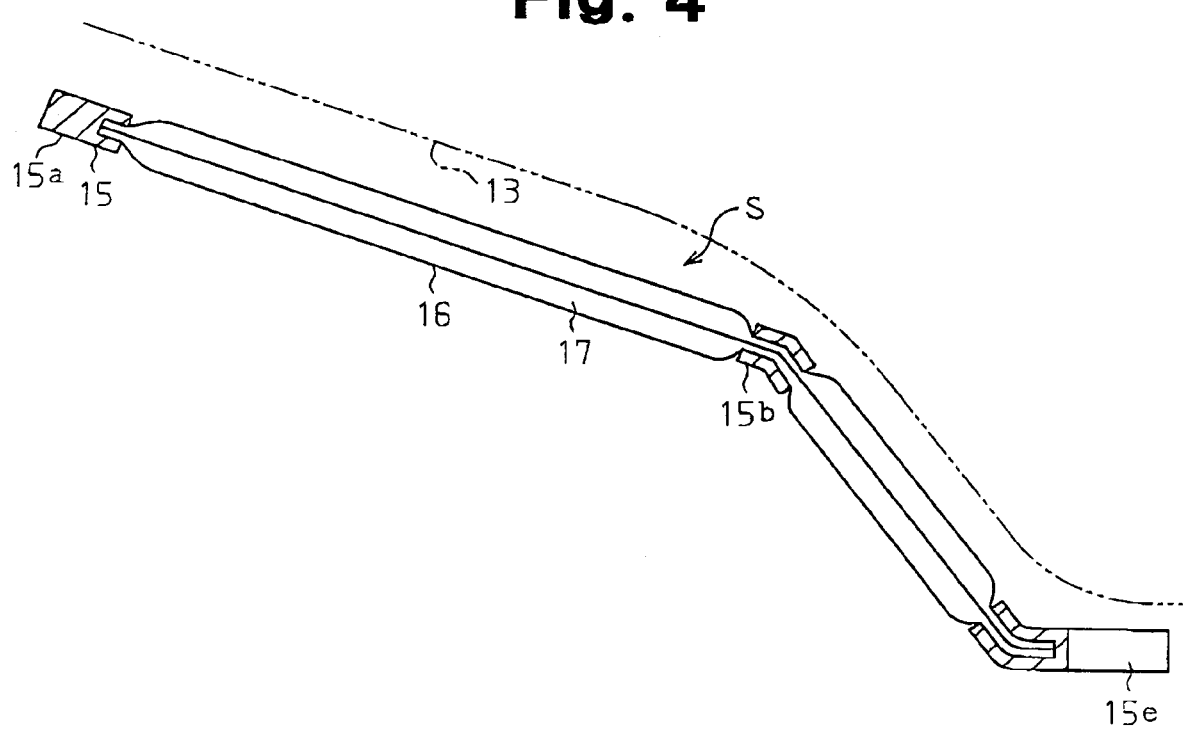
FIG. 4 is a cross-sectional view of the fuel adsorption member.

As shown in FIGS. 2 to 4, the fuel adsorption member 16 is bent in an intermediate portion and an end portion close to the second top wall portion 13d. The frame 15 is made of a synthetic resin, and has a rigidity. The frame 15 retains an adsorption sheet member 17 having a fuel adsorbing function in a tensioned state. As shown in FIGS. 4 and 7(C), the adsorption sheet member 17 is formed by retaining members 20 including an active carbon 23 serving as a granular adsorbent, and a pair of covering sheets 18 and 19 holding the retaining members 20 in between. A reinforcing sheet 21 is adhered to a lower surface of the covering sheet 19 forming the adsorption sheet member 17 in an overlapped state. Each retaining member 20 retains the active carbon 23 in a state of uniformly dispersing the active carbon 23 to an unwoven fabric fiber assembly 22. The reinforcing sheet 21 is formed of a fiber of a material and a thickness capable of resisting an impact pressure and a heat of a backfire. The adsorption sheet member 17 is formed along two surfaces comprising the inner surface of the first top wall portion 13b and the inner surface of the slant wall portion 13c. The adsorption sheet member 17 is arranged while being spaced at the gap S from the inner surface of the first top wall portion 13b and the inner surface of the slant wall portion 13c.

Figure 6:
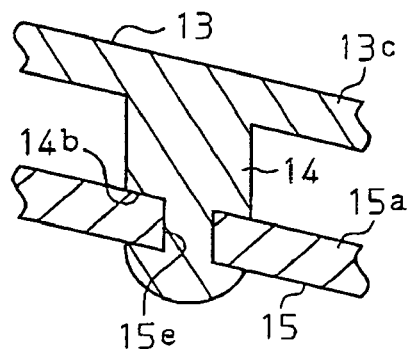
FIG. 6 is an enlarged cross-sectional view showing a portion of a fixing pin.

The frame 15 is formed by an outer peripheral frame portion 15a corresponding to an outer peripheral portion positioned in an outer periphery of the adsorption sheet member 17, an intermediate frame portion 15b corresponding to a sub frame, and three protruding pieces 15c. The outer peripheral frame portion 15a continuously extends along an outer periphery of the adsorption sheet member 17. The intermediate frame portion 15b is bridged between two line edges facing each other in the outer peripheral frame portion 15a. The intermediate frame portion 15b extends along a boundary line between the first top wall portion 13b and the slant wall portion 13c. The protruding pieces 15c are arranged in a lower side of the second top wall portion 13d. The outer peripheral frame portions 15a and the protruding pieces 15c have a plurality of holes 15e. As shown in FIG. 6, each of the fixing pins 14 of the second housing 13 is thermally swaged in a state of being fitted to each of the holes 15e of the frame 15. By the thermal swaging of each of the fixing pins 14, the fuel adsorption member 16 is fixed to the second housing 13 in the portion of the frame 15. Further, upper faces of the outer peripheral frame portion 15a and the protruding piece 15c are engaged with a step 14b of the fixing pin 14. By this engagement, the gap S is defined between the fuel adsorption member 16, the first top wall portion 13b, the slant wall portion 13c and the second top wall portion 13d.

Figure 5:
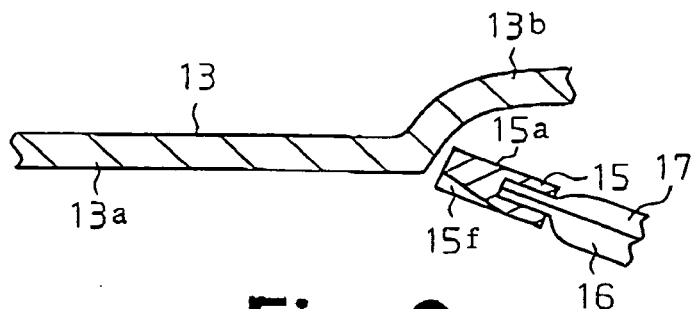
FIG. 5 is an enlarged cross-sectional view showing a slant face portion of a frame.

As shown in FIG. 5, a slant surface portion 15f for guiding the intake air E to the outlet port 13a is formed near the outlet port 13a on the lower surface of the frame 15.

Next, a description will be given of a manufacturing method of the fuel adsorption member 16.

Figure 7A:
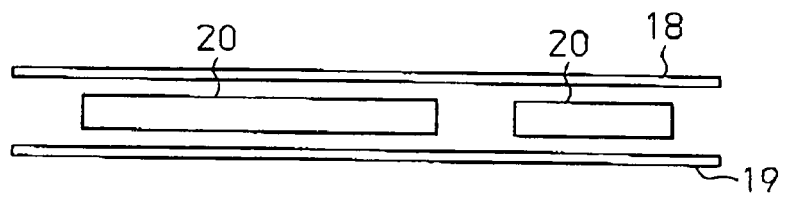
FIG. 7(A) is a side elevational view showing a manufacturing process of the fuel adsorption member.
Figure 7B:
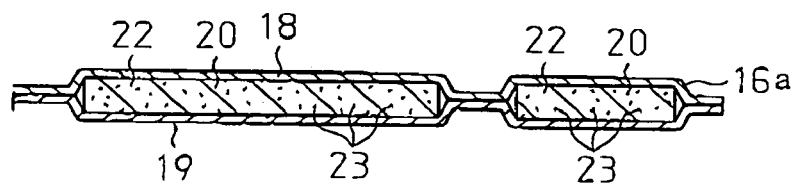
FIG. 7(B) is a cross sectional view showing the manufacturing process of the fuel adsorption member.
Figure 7C:
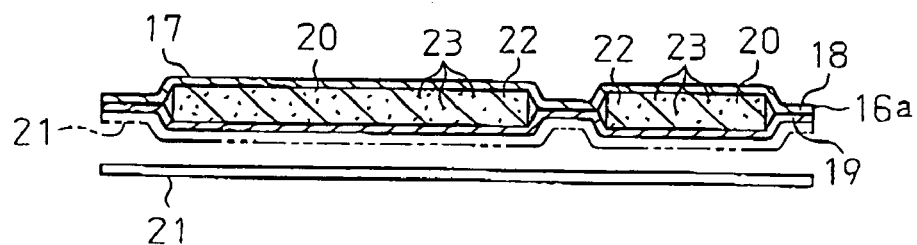
FIG. 7(C) is a cross sectional view showing the manufacturing process of the fuel adsorption member.

As shown in FIG. 7(A), two retaining members 20 are prepared, and the retaining members 20 are arranged while being spaced with each other. The covering sheets 18 and 19 are arranged in such a manner as to hold both retaining members 20 in between. Next, as shown in FIG. 7(B), a sheet main body 16a is formed by welding both the covering sheets 18 and 19 by outer edge portions thereof and an outer peripheral portion of the retaining member 20 by means of a hot press. Next, as shown in FIG. 7(C), the reinforcing sheet 21 is lapped over the sheet main body 16a, and the sheet main body 16a is arranged within a mold (not shown) in a state of being bent at a predetermined position. Further, the frame 15 is formed by injecting a molten resin into the mold and solidifying the molten resin. As a result, the adsorption sheet member 17 is provided in a tensional manner in an inner side of the frame 15 in an bent shape as shown in FIG. 4.

Next, a description will be given of an operation of the air cleaner.

When the engine is operated, the intake air E is sucked to the engine through an inner side of the cleaner 11 from the inlet port 12a. At this time, a dust contained in the intake air E is filtrated by the filter element 10. In the present embodiment, the fuel adsorption member 16 extends along the inner surfaces of the first top wall portion 13b, the slant wall portion 13c and the second top wall portion 13d, that is, along the flow direction of the intake air E. Accordingly, the fuel adsorption member 16 can reduce the ventilation resistance without adversely affecting the intake air E. Further, the slant surface portion 15f of the outer peripheral frame portion 15a inhibits an eddy current from being generated near an end edge of the outer peripheral frame portion 15a, and contributes to a further reduction of the ventilation resistance.

Further, the outer peripheral frame portion 15a having a rigidity forms an outer periphery of the fuel adsorption member 16, and the fuel adsorption member 16 is fixed to the second housing 13 through thermal swaging of the fixing pin 14. Accordingly, it is possible to inhibit the adsorption sheet member 17 from being deformed by the vehicle vibration, the fluctuation of the intake pressure or the like. Therefore, it is possible to prevent the adsorption sheet member 17 from being damaged and prevent the active carbon 23 from being worn. In addition, in the case that the backfire is generated, the impact pressure of the backfire is propagated within the second housing 13. In the present embodiment, the fuel adsorption member 16 is arranged along a flow path A of the intake air E. Accordingly, the fuel adsorption member 16 is not directly exposed to the impact pressure of the backfire. Further, the fuel adsorption member 16 is provided in a tensioned manner in the inner side of the outer peripheral frame portion 15a having the rigidity. Therefore, it is possible to inhibit the fuel adsorption member 16 from being damaged by the impact pressure of the backfire. Further, the reinforcing sheet 21 can protect the fuel adsorption member 16 from the heat of the backfire.

When the engine stops, the fuel vapor leaking from the intake system of the engine is adsorbed by the active carbon 23 of the fuel adsorption member 16 after making an intrusion into the second housing 13 from the outlet port 13a. Accordingly, it is possible to prevent the fuel vapor causing air pollution from being discharged to the ambient air.

When the engine is restarted, the fuel vapor adsorbed to the fuel adsorption member 16 breaks away into the intake air E passing through the lower portion of the fuel adsorption member 16 and the gap S. Further, the fuel vapor in the suction air E is sucked into the engine so as to be burnt.

In accordance with the first embodiment, the following advantages are obtained.

(1) The fuel adsorption member 16 is provided in such a manner as to cover the first top wall 13b and the slant wall portion 13c of the second housing 13. In other words, since the fuel adsorption member 16 has a wide area, the fuel adsorption member 16 can sufficiently adsorb the fuel vapor leaking from the engine (2) When the engine is restarted, the fuel vapor adsorbed to the fuel adsorption member 16 breaks away not only into the intake air E passing through the lower portion of the fuel adsorption member 16, but also into the intake air E passing through the gap S in the upper portion of the fuel adsorption member 16. Accordingly, it is possible to quickly restore the fuel adsorbing function of the fuel adsorption member 16.

(3) The fuel adsorption member 16 is fixed to a plurality of fixing pins 14 extending in the same direction. Accordingly, it is easy to execute a mounting work of the fuel adsorption member 16 to each of the fixing pins 14 and a thermal swaging of a distal end portion of each of the fixing pins 14.

(4) The fuel adsorption member 16 is arranged along the flow path A of the intake air E. Accordingly, since an increase of the ventilation resistance is suppressed, it is possible to achieve an improvement of the specific fuel consumption and an improvement of the engine output.

(5) The fuel adsorption member 16 is firmly fixed to the second housing 13 by the fixing pins 14. Accordingly, even if the backfire is generated, it is possible to prevent the fuel adsorption member 16 from being damaged. Therefore, is possible to prevent a reduction of the fuel adsorbing function caused by the damage of the fuel adsorption member 16, a malfunction of the engine caused by the suction of the broken piece and the wear powder, and the like.

(6) The fuel adsorption member 16 is structured such as to be hard to be deformed by the vehicle vibration, the fluctuation of the intake pressure or the like. Accordingly, it is possible to prevent the damage of the fuel adsorption member 16 caused by the accumulated fatigue, the reduction of the fuel adsorbing function caused by the abrasion of the active carbon 23, and the like.

(7) The fuel adsorption member 16 has the intermediate frame portion 15b supporting the adsorption sheet member 17, and is bent in the portion of the intermediate frame portion 15. In other words, the intermediate frame portion 15b functions as a support member bending the adsorption sheet member 17 so as to support, at a position corresponding to the bent portion of the fuel adsorption member 16. Accordingly, it is possible to effectively prevent a tramp and a vibration of the adsorption sheet member 17 due to the vehicle vibration or the like.

(8) As mentioned above, in the case that the air cleaner in accordance with the present embodiment is used, the fuel adsorbing function can be effectively achieved, it is possible to reduce the ventilation resistance, it is possible to prevent the damage of the adsorption sheet member 17 and the wear of the active carbon, and it is possible to rotate the engine at a high efficiency.

Second Embodiment

Next, a description will be given of a second embodiment in accordance with the present invention with reference to FIG. 8. In the description of the second embodiment and each of the subsequent embodiments, the description will be given mainly of different portions from the first embodiment.

Figure 8:
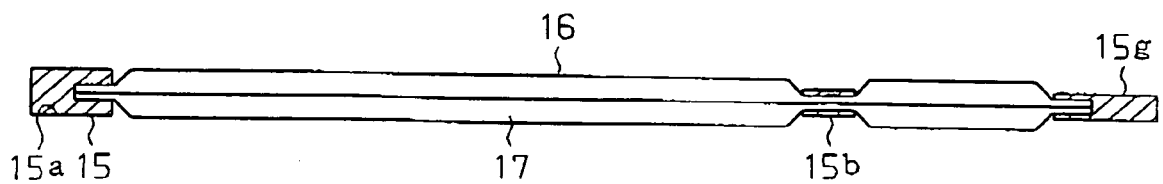
FIG. 8 is a cross sectional view showing a fuel adsorption member in accordance with a second embodiment.

As shown in FIG. 8, the intermediate frame portion 15$b$ of the frame 15, the outer peripheral frame portion 15$a$ near both ends of the intermediate frame portion 15$b$, and a portion 15$g$ of the outer peripheral frame portion 15$a$ near each of the protruding pieces 15$c$ are formed thinner than the corresponding portions in the first embodiment. Accordingly, it is easy to bend the fuel adsorption member 16 in the thinned portions.

In accordance with the second embodiment, it is possible to obtain the following advantage.

(9) It is easy to bend the frame 15 even after forming the frame 15. Accordingly, even if the fuel adsorption member 16 is formed in a flat shape, it is possible to bend the fuel adsorption member 16 along the shape of the inner surface of the second housing 13. Therefore, an advantage can be obtained at a time of assembling the fuel adsorption member 16 in the second housing 13. In this case, it is sufficient that the mold forming the frame 15 has a flat cavity. Therefore, it is possible to intend to downsize a manufacturing equipment for the air cleaner 11 and reduce an equipment cost.

Third Embodiment

Next, a description will be given of a third embodiment in accordance with the present invention with reference to FIG. 9.

Figure 9:
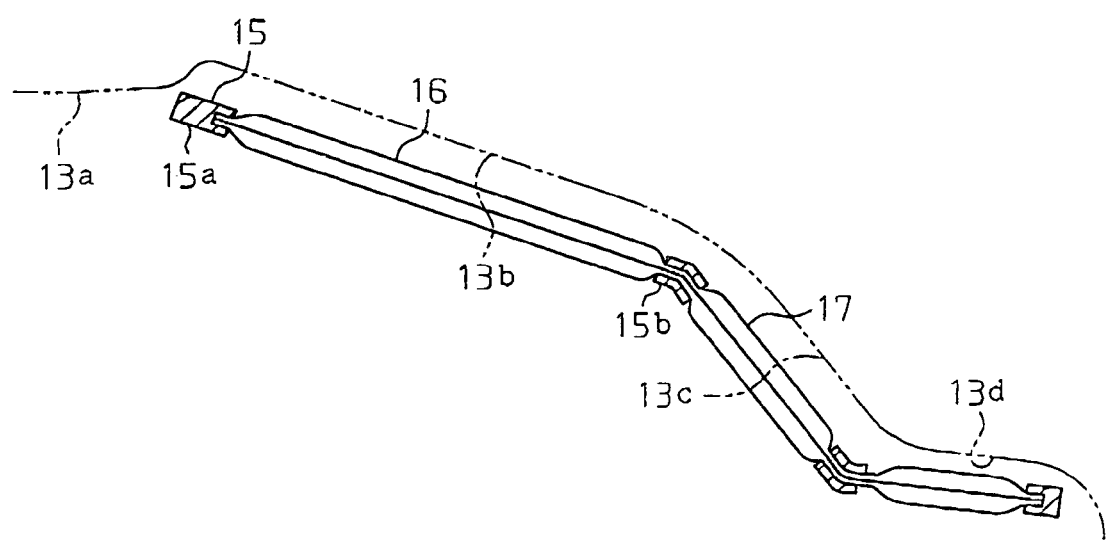
FIG. 9 is a cross sectional view showing a fuel adsorption member in accordance with a third embodiment.

As shown in FIG. 9, the adsorption sheet member 17 is formed along three surfaces comprising the inner surface of the first top wall portion 13$b$, the inner surface of the slant wall portion 13$c$ and the inner surface of the second top wall portion 13$d$.

In accordance with the third embodiment, it is possible to obtain the following advantage.

(10) The adsorption sheet member 17 has a wider fuel vapor adsorbing area than the first embodiment. Accordingly, it is possible to improve the fuel adsorbing function of the fuel adsorption member 16.

Fourth Embodiment

Next, a description will be given of a fourth embodiment in accordance with the present invention with reference to FIGS. 10(A) and 10(B).

Figure 10A:
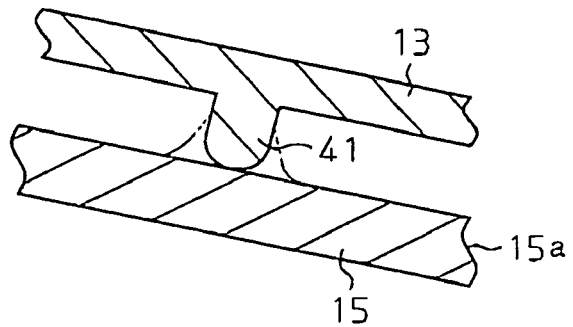
FIG. 10(A) is an enlarged cross sectional view showing a projection in accordance with a fourth embodiment.
Figure 10B:
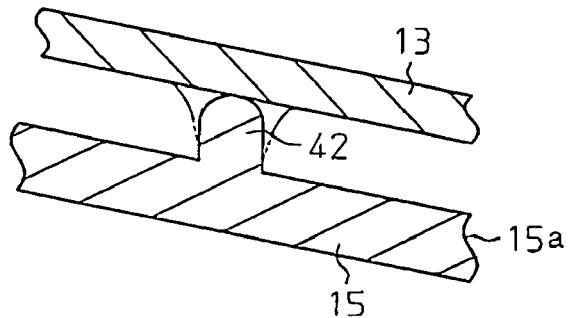
FIG. 10(B) is an enlarged cross sectional view showing the projection in accordance with the fourth embodiment.

As shown in FIG. 10(A), a projection 41 is formed on the inner surface of the second housing 13. When assembling the fuel adsorption member 16, a distal end of the projection 41 is joined to the upper face of the frame 15, and an ultrasonic vibration is applied to the joined portion. Then, as shown by a two-dot chain line in FIG. 10(A), the projection 41 is molten, and the fuel adsorption member 16 is welded to the second housing 13. Further, as shown in FIG. 10(B), a projection 42 may be formed on the upper surface of the frame 15. In this case, the fuel adsorption member 16 can be welded to the second housing 13 by using the same method as the case in FIG. 10(A). Further, the projection may be formed in both of the second housing 13 and the frame 15.

In accordance with the fourth embodiment, it is possible to obtain the following advantage.

(11) It is not necessary to fit each of the fixing pins 14 of the second housing 13 to the hole 15$e$ of the frame 15. Accordingly, it is easy to assemble the fuel adsorption member 16 in the second housing 13.

Fifth Embodiment

Next, a description will be given of a fifth embodiment in accordance with the present invention with reference to FIG. 11.

Figure 11:
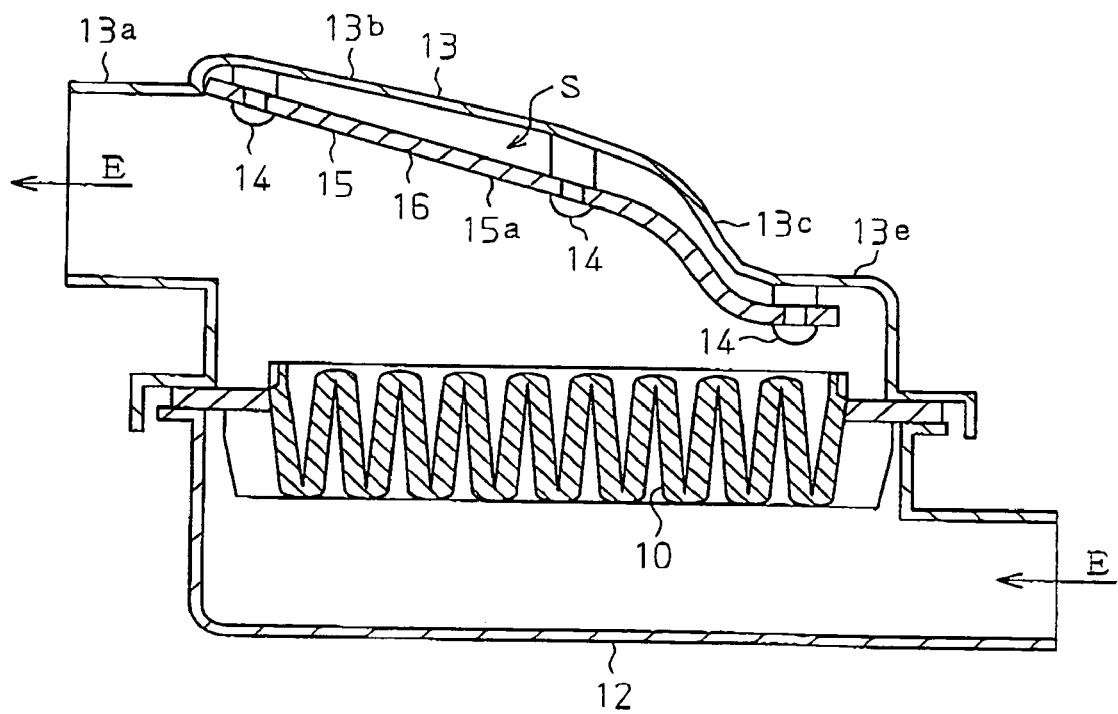
FIG. 11 is a vertical cross sectional view showing an air cleaner in accordance with a fifth embodiment.

As shown in FIG. 11, the frame 15 is smoothly curved along the inner surface of the second housing 13. Accordingly, the fuel adsorption member 16 is smoothly curved along the inner surface of the second housing 13. Further, although an illustration is omitted, the intermediate frame portion 15$b$ is provided in the curved portion of the frame 15.

In accordance with the fifth embodiment, it is possible to obtain the following advantage.

(12) It is possible to prevent damage of the frame 15 while avoiding a stress concentration to the specific position of the frame 15 by forming the frame 15 in the smooth curved shape.

Sixth Embodiment

Next, a description will be given of a sixth embodiment in accordance with the present invention with reference to FIGS. 12(A) and 12(B).

Figure 12A:
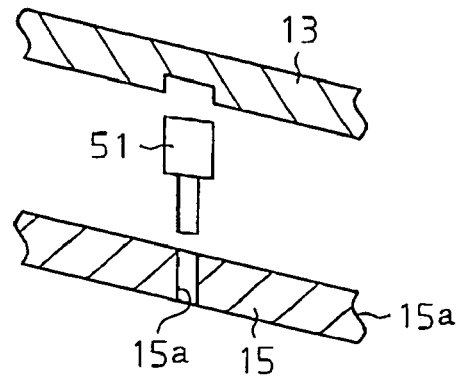
FIG. 12(A) is an enlarged cross sectional view showing a portion near a fixing pin in accordance with a sixth embodiment.
Figure 12B:
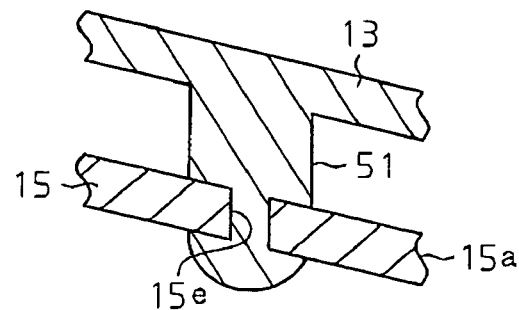
FIG. 12(B) is an enlarged cross sectional view showing the portion near the fixing pin in accordance with the sixth embodiment.
Figure 13:
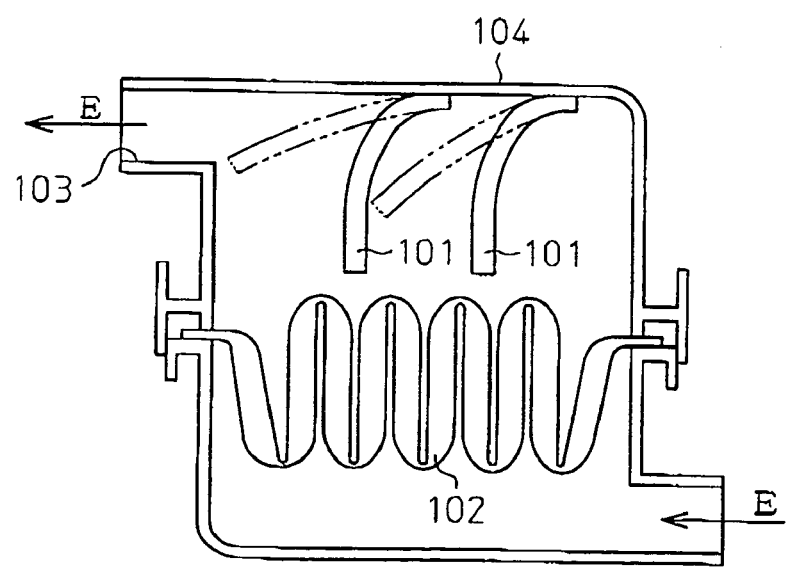
FIG. 13 is a vertical cross sectional view showing an air cleaner in accordance with a first prior art.
Figure 14:
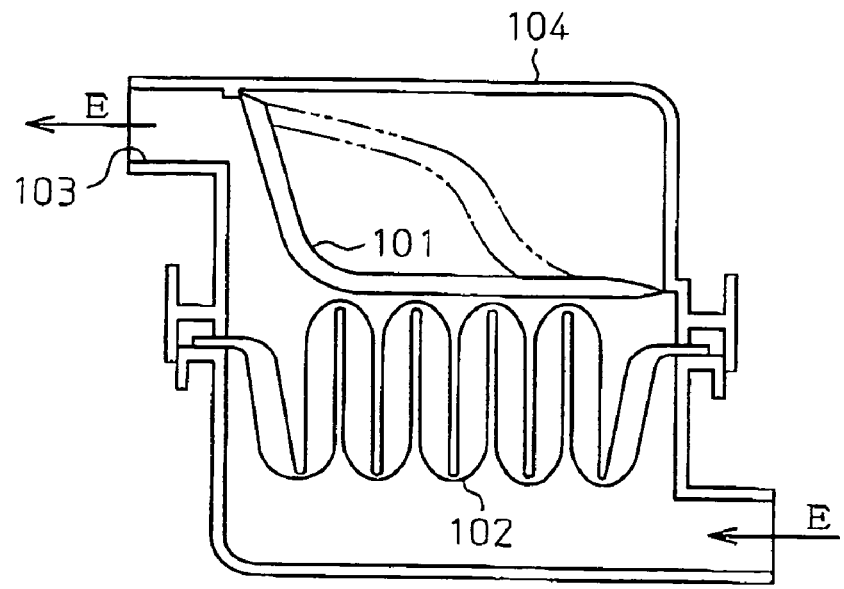
FIG. 14 is a vertical cross sectional view showing the air cleaner in accordance with the first prior art.
Figure 15:
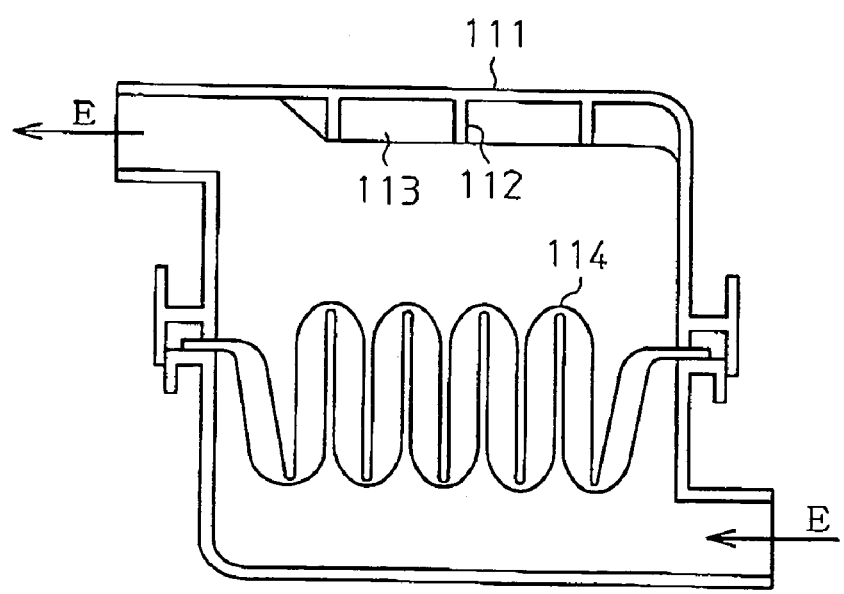
FIG. 15 is a vertical cross sectional view showing an air cleaner in accordance with a second prior art.
Figure 16:
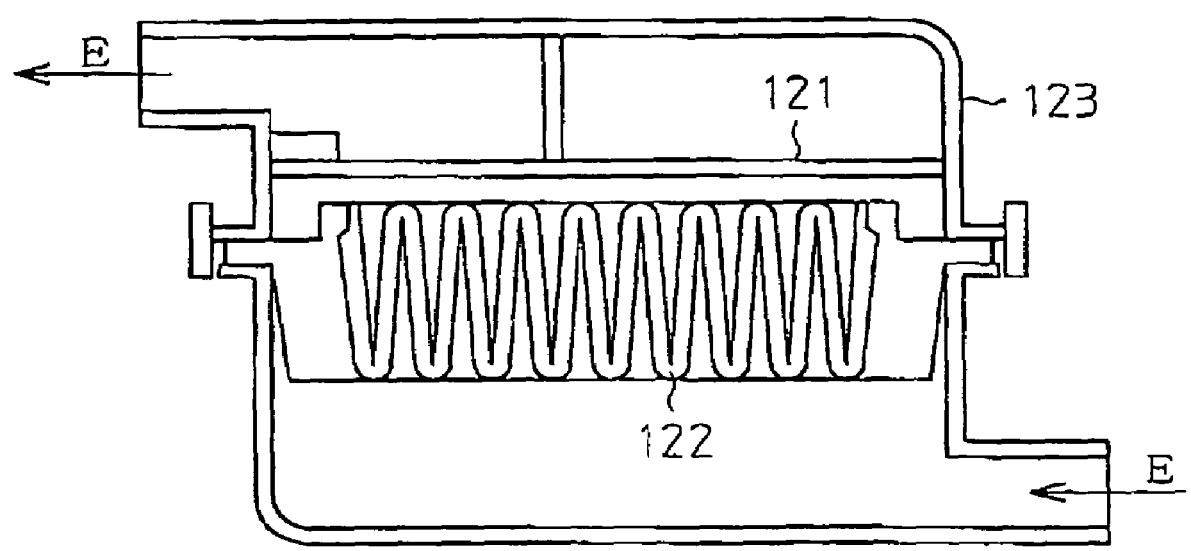
FIG. 16 is a vertical cross sectional view showing an air cleaner in accordance with a third prior art.

As shown in FIGS. 12(A) and 12(B), the frame 15 is assembled in the second housing 13 via a fixing pin 51, which is an independent member. The fixing pin 51 is made of the same material as the second housing 13. In this case, in the same manner as the fourth embodiment, the fuel adsorption member 16 is welded to the second housing 13 through thermal swaging by applying the ultrasonic vibration to the fixing pin 51. Accordingly, in the sixth embodiment, it is possible to obtain the same advantage as that of the fourth embodiment.

These embodiments may be modified as follows.

In each of the embodiments mentioned above, the adsorption sheet member 17 of the fuel adsorption member 16 may be arranged on the inner surface of the side wall of the second housing 13, or the inner surface of the upper wall and the inner surface of the side wall.

In each of the embodiments mentioned above, the covering sheet 19 may be formed by a material capable of resisting the pressure and the heat of the backfire while omitting the reinforcing sheet 21.

In each of the embodiments mentioned above, the fuel adsorption member 16 may be closely attached to the inner surface of the second housing 13. In this case, the fuel vapor adsorbed to the fuel adsorption member 16 breaks away from the lower surface of the fuel adsorption member 16 to the intake air E.

The invention claimed is:

1. An air cleaner provided with a filter element within a housing, comprising:

a fuel adsorption member for adsorbing a fuel vapor;

said fuel adsorption member being arranged downstream of said filter element;

said fuel adsorption member being provided with a sheet member having a fuel adsorbing function, and a frame for fixing the sheet member to said housing;

said frame having a rigidity;

said sheet member being provided in a tensioned manner in an inner side of said frame;

said fuel adsorption member being provided with a portion which is bent or curved along at least two surfaces facing an air flow path within said housing;

said at least two surfaces being arranged adjacent to each other;

said fuel adsorption member extending along said air flow path;

a support member provided in said frame for supporting said sheet member; and said support member maintaining said sheet member in a bent state or a curved state, in the bent portion or the curved portion of said fuel adsorption member.

2. The air cleaner as claimed in claim 1, wherein said fuel adsorption member is fixed to the inner surface of said housing by a plurality of fixing pins which extend in the same direction and are in parallel to each other.

3. The air cleaner as claimed in claim 1, wherein a gap communicating with said air flow path is formed between the inner surface of said housing and said fuel adsorption member.

4. The air cleaner as claimed in claim 1, wherein said frame is provided with an outer peripheral portion positioned in an outer periphery of said sheet member, and a sub frame bridged over two line edges facing each other in the outer peripheral portion, and said support member is formed by said sub frame.

5. The air cleaner as claimed in claim 4, wherein a portion corresponding to said bent portion of said frame is formed thinner than the other portions.

6. The air cleaner as claimed in claim 2, wherein said fixing pins are integrated with said housing.

7. The air cleaner as claimed in claim 2, wherein said fixing pins are integrated with said frame.

8. The air cleaner as claimed in claim 6, wherein said fixing pins each have a step for forming a gap between said fuel adsorption member and said housing by engaging with said frame.

9. The air cleaner as claimed in claim 2, wherein said fixing pins have the same material as said housing.

10. The air cleaner as claimed in claim 1, wherein said sheet member is formed by a retaining member including an adsorbent, and a pair of covering sheets holding the retaining member in between.

11. The air cleaner as claimed in claim 10, wherein said retaining member retains said adsorbent in a state of uniformly dispersing said adsorbent in an unwoven fabric fiber assembly.

12. The air cleaner as claimed in claim 10, further comprising a reinforcing sheet for covering a surface of one of said pair of covering sheets that faces said air flow path.

13. The air cleaner as claimed in claim 12, wherein said reinforcing sheet has a heat resistance.

14. The air cleaner as claimed in claim 1, wherein said fuel adsorption member adsorbs fuel vapor leaking from an intake system of an engine.

* * * * *